(12) United States Patent
Alarcon Hernandez et al.

(10) Patent No.: US 11,292,412 B2
(45) Date of Patent: Apr. 5, 2022

(54) SEALED BLADDER WITH PRESSURE SENSOR

(71) Applicant: Ford Global Technologies, LLC, Dearborn, MI (US)

(72) Inventors: Jesus Alfonso Alarcon Hernandez, Toluca (MX); Zhibing Deng, Northville, MI (US); David James Bauch, South Lyon, MI (US); Joseph Edward Abramczyk, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 677 days.

(21) Appl. No.: 16/277,208

(22) Filed: Feb. 15, 2019

(65) Prior Publication Data

US 2020/0262378 A1    Aug. 20, 2020

(51) Int. Cl.
| | | |
|---|---|---|
| *B60R 21/0132* | (2006.01) | |
| *B60R 21/0136* | (2006.01) | |
| *B60R 21/00* | (2006.01) | |

(52) U.S. Cl.
CPC .. *B60R 21/0132* (2013.01); *B60R 2021/0006* (2013.01)

(58) Field of Classification Search
CPC ............... B60R 21/0132; B60R 2021/0006
See application file for complete search history.

(56) References Cited

U.S. PATENT DOCUMENTS

| | | |
|---|---|---|
| 5,338,062 A | 8/1994 | Kiuchi et al. |
| 7,603,216 B2 | 10/2009 | Tanabe |
| 9,944,242 B2 | 4/2018 | Higashimachi |

FOREIGN PATENT DOCUMENTS

| | | |
|---|---|---|
| JP | 3843640 B2 | 11/2006 |
| JP | 2007196946 A | 8/2007 |
| JP | 2018118632 A | 8/2018 |

*Primary Examiner* — Mathew Franklin Gordon
(74) *Attorney, Agent, or Firm* — Frank A. MacKenzie; Bejin Bieneman PLC

(57) ABSTRACT

A vehicle includes a hinge pillar, a fender adjacent the hinge pillar, and a sealed bladder. The sealed bladder includes a first chamber and a second chamber in fluid communication with the first chamber. The first chamber is on the hinge pillar and the second chamber is in the fender. A pressure sensor is fixed to the second chamber and in fluid communication with the second chamber.

19 Claims, 7 Drawing Sheets

SEALED BLADDER WITH PRESSURE SENSOR

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle between forward-facing and rearward-facing positions. The rotation of the seats places the occupants in different positions in the event of a collision to the vehicle.

DETAILED DESCRIPTION

Figure 1:
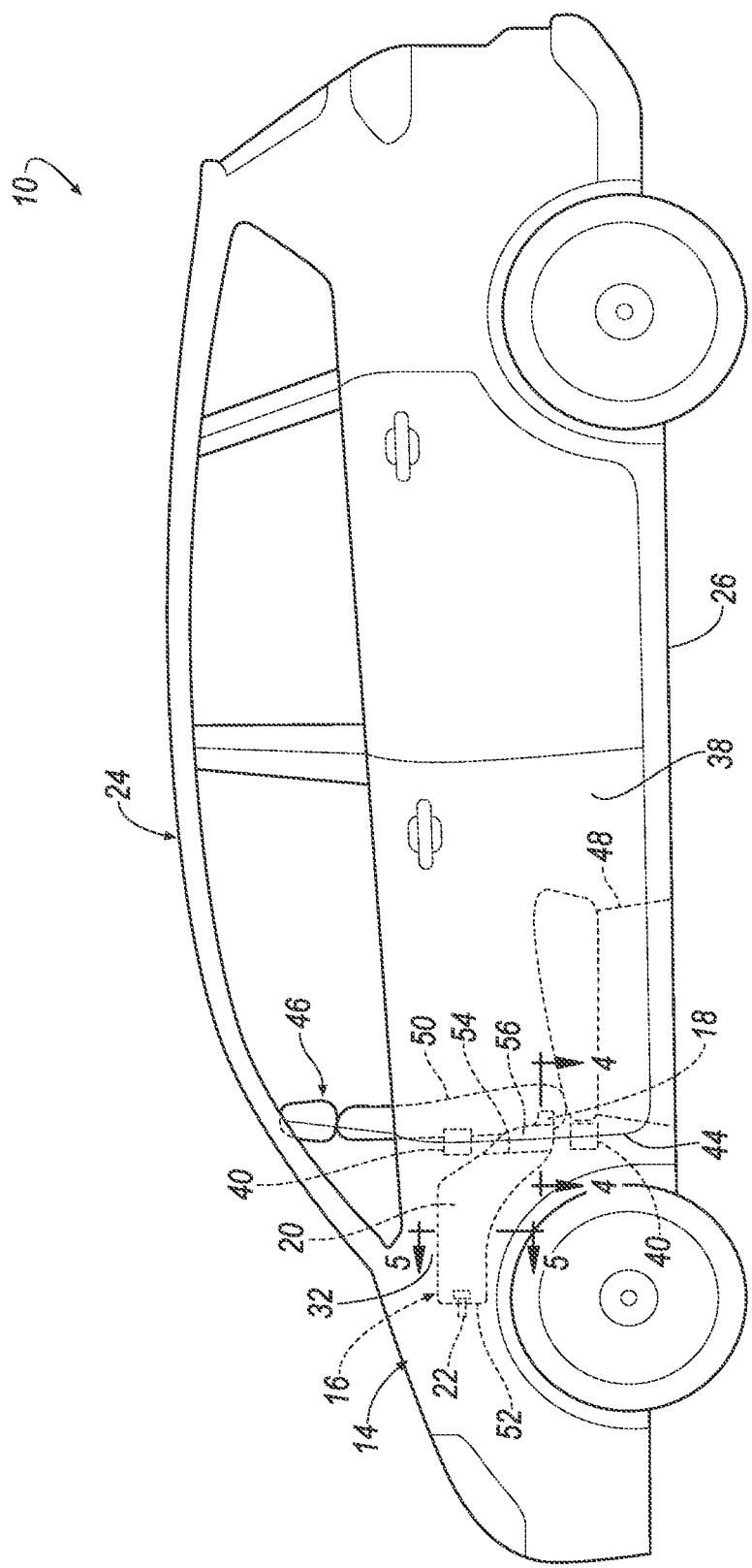
FIG. 1 is a side view of a vehicle with a sealed bladder shown in hidden lines behind a fender and a door.

A vehicle includes a hinge pillar, a fender adjacent the hinge pillar, and a sealed bladder. The sealed bladder includes a first chamber and a second chamber in fluid communication with the first chamber. The first chamber is on the hinge pillar and the second chamber is in the fender. The vehicle includes a pressure sensor fixed to the second chamber and in fluid communication with the second chamber.

The sealed bladder may include a connector fluidly connecting the first chamber and the second chamber.

The first chamber and the second chamber may each reduce in volume to the connector.

The connector may be thinner than the first chamber and the second chamber in a cross-vehicle direction.

The connector at the first chamber may have the same height as the first chamber in a vertical direction, and the connector at the second chamber may have the same height as the second chamber in a vertical direction.

The first chamber may have a volume smaller than the second chamber.

The vehicle may further include a door having a pair of hinges attached to the hinge pillar. The door may be rotatable about the hinges.

The vehicle may further include a seat movable to a rearward position and including a seat back. The seat back may be adjacent the hinge pillar and the door in the rearward position.

The first chamber may be positioned between the hinges.

The door may overlap the hinge pillar in a cross-vehicle direction and may define a cross-vehicle gap between the door and the hinge pillar. The door may be adjacent the fender to define a vehicle-forward gap between the door and the fender.

The sealed bladder may include a connector fluidly connecting the first chamber and the second chamber. The vehicle-forward gap may be aligned with the connector in a cross-vehicle direction.

The connector may be in the cross-vehicle gap.

The connector, first chamber and second chamber may define a cutout in cross-vehicle gap. The door may extend into the cutout when the door is in an open position.

The first chamber may be exposed when the door is in the open position.

The first chamber may be between the hinge pillar and the door.

The second chamber may have a vehicle-forward end and the pressure sensor is located on the vehicle-forward end.

The vehicle may further include a seat movable to a rearward position and including a seat back, the seat back being adjacent the hinge pillar.

The first chamber may be positioned to be compressed by a pole of a 15° oblique pole crash test.

With reference to the Figures, wherein like numerals indicate like parts throughout the several views, a vehicle 10 includes a hinge pillar 12, a fender 14 adjacent the hinge pillar 12, and a sealed bladder 16. The sealed bladder 16 includes a first chamber 18 and a second chamber 20 in fluid communication with the first chamber 18. The first chamber 18 is on the hinge pillar 12 and the second chamber 20 is in the fender 14. A pressure sensor 22 is fixed to the second chamber 20 and in fluid communication with the second chamber 20.

The location of the first chamber 18 on the hinge pillar 12 and the second chamber 20 in the fender 14 allows for the sealed bladder 16 to detect side impacts at the hinge pillar 12 and/or the fender 14. For example, in the event of an impact that crushes the fender 14, the fender 14 squeezes the second chamber 20 causing a pressure change in the second chamber 20 that is detected by the pressure sensor 22. In the event of an impact that crushes the hinge pillar 12, the hinge pillar 12 squeezes the first chamber 18 causing a pressure change in the first chamber 18, which causes a pressure change in the second chamber 20 that is detected by the pressure sensor 22. The change in pressure measured by the pressure sensor 22 is used to operate airbags (not shown) of the vehicle 10, e.g., a side airbag mounted to a seat 46, a curtain airbag mounted to a roof, etc. By extending both in the fender 14 and at the hinge pillar 12, the sealed bladder 16 detects impact over a length of the vehicle 10. As described below, this configuration provides similar sensitivity to impact detection at both the hinge pillar 12 and the fender 14, i.e., an impact at the hinge pillar 12 is detected in approximately the same amount of time as an impact at the fender 14.

The vehicle 10 may be of any type of passenger or commercial automobile such as a car, a truck, a sport utility vehicle, a crossover vehicle, a van, a minivan, a taxi, a bus, etc., or may be a watercraft, aircraft, etc. The vehicle 10 may be manually operated by an occupant of the vehicle 10, or the vehicle 10 may be operated in an autonomous mode.

The vehicle 10 may include a body 24 and a frame 26. The body 24 and frame 26 may be of a unibody construction. In the unibody construction, the body 24, e.g., rockers, serves as the frame 26, and the body 24 (including the rockers, pillars, roof rails, etc.) is unitary, i.e., a continuous one-piece unit. As another example, the body 24 and frame 26 may have a body-on-frame construction (also referred to as a cab-on-frame construction). In other words, the body 24 and frame 26 are separate components, i.e., are modular, and the body 24 is supported on and affixed to the frame 26.

Alternatively, the body 24 and frame 26 may have any suitable construction. The body 24 and/or the frame 26 may be formed of any suitable material, for example, steel, aluminum, etc. The body 24 of the vehicle 10 may define a passenger compartment to house occupants, if any, of the vehicle.

With reference to FIGS. 1-4, the body 24 of the vehicle 10 includes the hinge pillar 12. The hinge pillar 12 may be elongated generally vertically. The hinge pillar 12 may include a hinge pillar outer 28 and a hinge pillar inner 30. The hinge pillar outer 28 and the hinge pillar inner 30 may be fixed to one another, e.g., by welding or any other attachment method. The hinge pillar outer 28 may have a class-A surface, i.e., a surface specifically manufactured to have a high-quality, finished aesthetic appearance free of blemishes.

The body 24 includes the fender 14 adjacent the hinge pillar 12. The fender 14 may include a fender outer 32 and a fender inner 34. The fender outer 32 and fender inner 34 may be fixed to one another, i.e., by welding or any other suitable attachment. The fender outer 32 may have a class-A surface, i.e., a surface specifically manufactured to have a high-quality, finished aesthetic appearance free of blemishes. The fender outer 32 and the fender inner 34 may define a cavity 36 between the fender inner 34 and the fender outer 32. As an example, the fender 14 shown in the figures is a front fender and the hinge pillar 12 shown in the figures is a front hinge pillar, i.e., at the A-pillar. As another example, the fender 14 may be a rear fender, also referred to as a quarter panel, and the hinge pillar 14 may be a rear hinge pillar, e.g., a C-pillar, D-pillar, etc.

Figure 2:
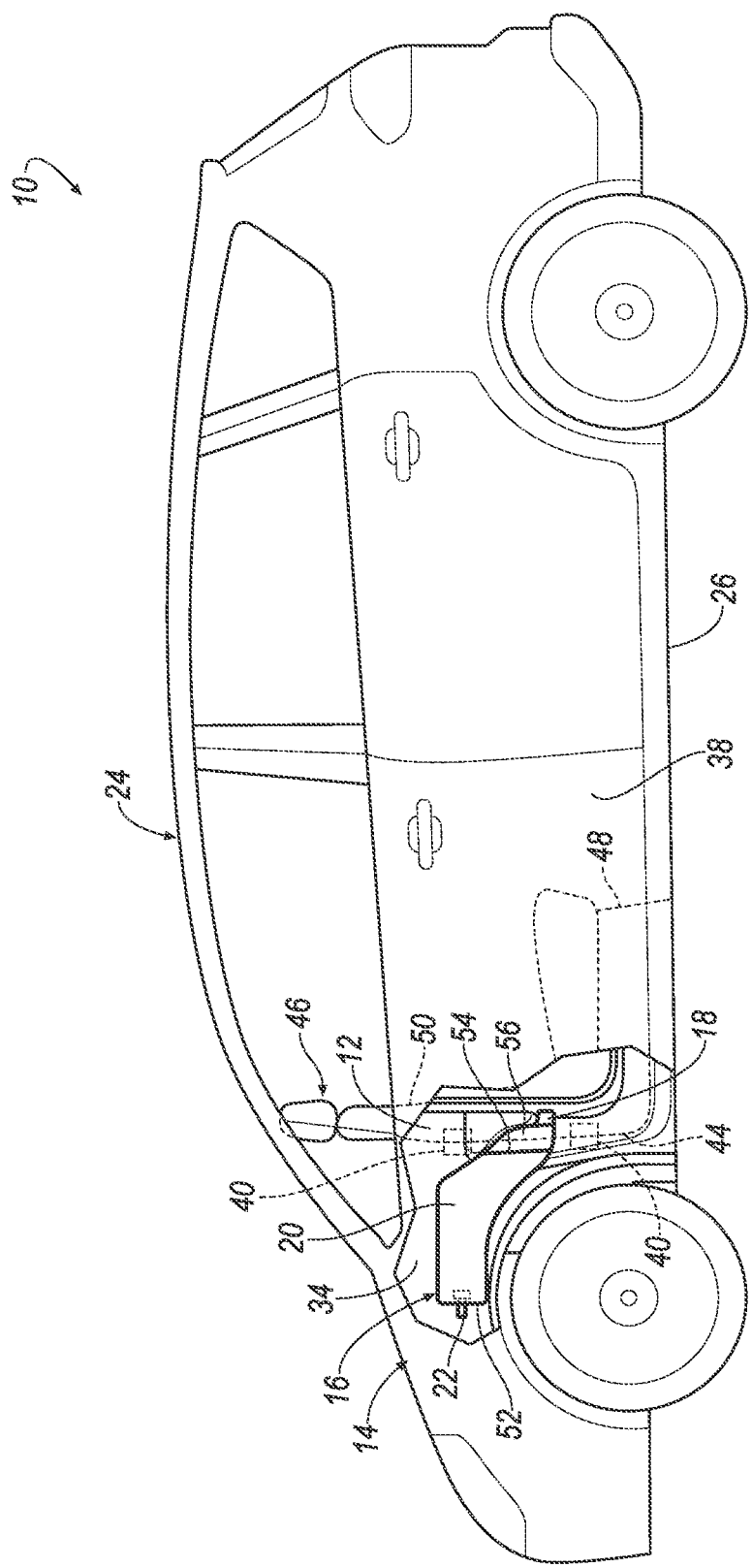
FIG. 2 is a cut away view of FIG. 1 showing the sealed bladder.
Figure 3:
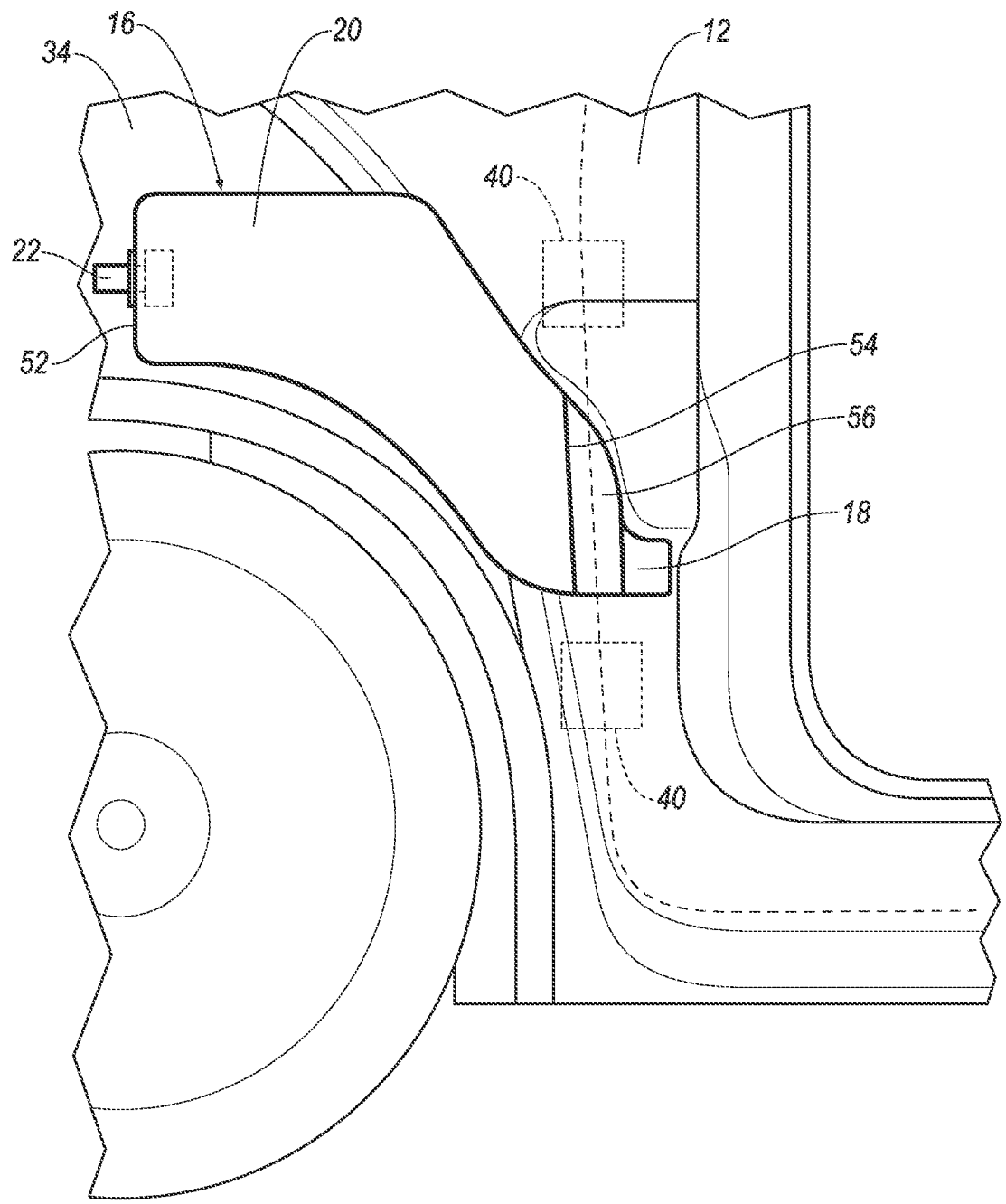
FIG. 3 is a magnified view of a portion of FIG. 2.

As shown in FIGS. 1 and 2, the vehicle 10 includes a door 38. The door 38 may include one or more hinges 40 attached to the hinge pillar 12. The hinges 40 may be attach to the hinge pillar 12 by, for example, fastener, welding, etc. The door 38 is rotatable about the hinges 40. The door 38 may rotate between an open position and a closed position.

The door 38 overlaps the hinge pillar 12 in a cross-vehicle direction Cv in the closed position i.e., a portion of the door 38 and the hinge pillar 12 are on a common cross-vehicle axis. When the door 38 is in the open position, the hinge pillar outer 28 may be exposed. Specifically, the hinge pillar outer 28 may be visible when the door 38 is in the open position.

Figure 4:
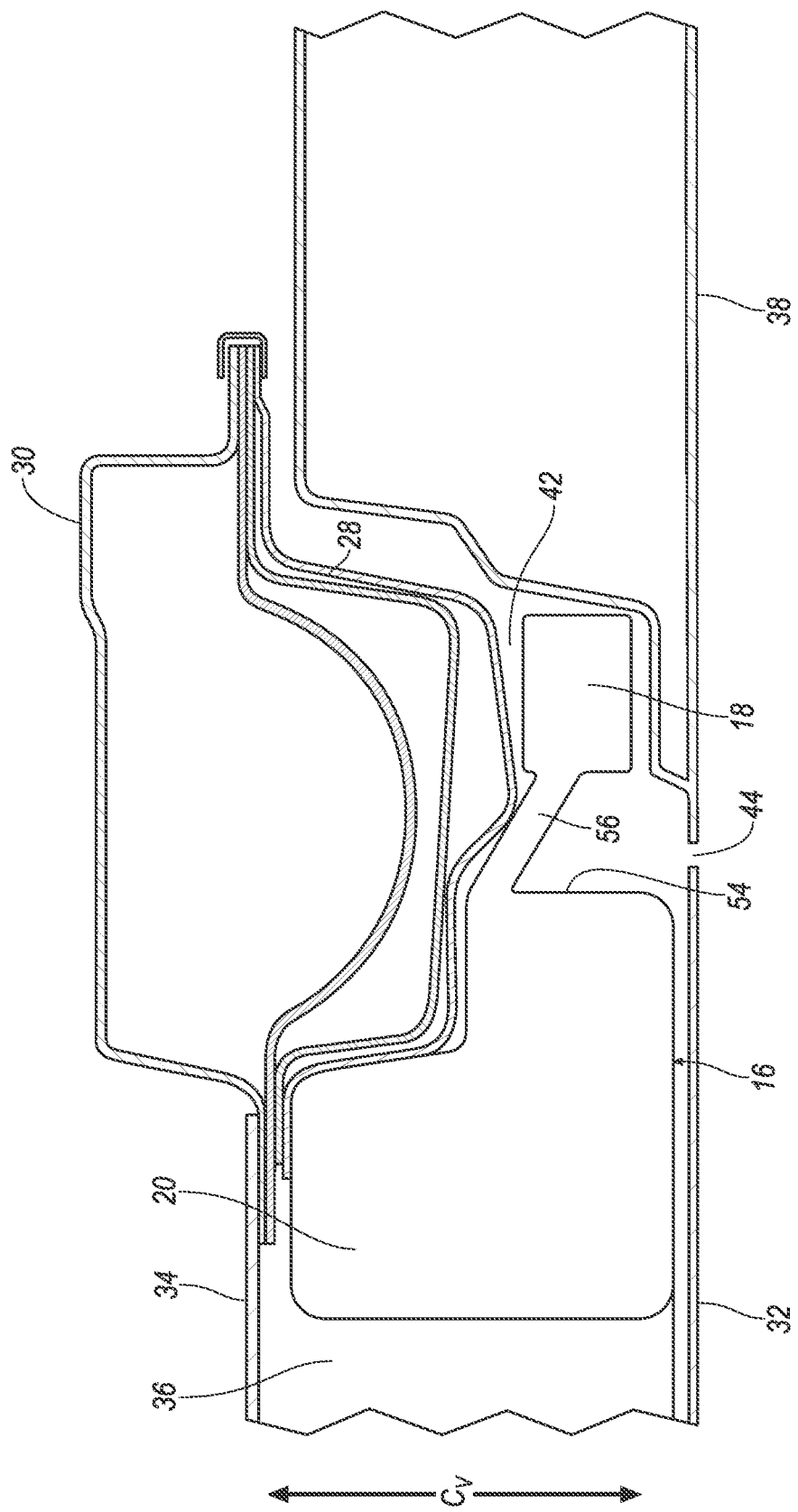
FIG. 4 is a cross-sectional view through line 4 in FIG. 1 with the door in a closed position.

As shown in FIG. 4, the door 38 and hinge pillar 12 define a cross-vehicle gap 42 in the cross-vehicle direction Cv between the door 38 and the hinge pillar 12 when the door 38 is in the closed position. The cross-vehicle gap 42 extends from the portion of the door 38 that overlaps the hinge pillar 12 to the hinge pillar 12. The hinges 40 of the door 38 attach to the hinge pillar 12 in the cross-vehicle gap 42.

The door 38 is adjacent the fender 14. The door 38 and the fender 14 define a vehicle-forward gap 44 between the door 38 and the fender 14.

The vehicle 10 may include a seat 46 in the passenger compartment. The seat 46 may be adjacent the door 38 and the hinge pillar 12.

The seat 46 may be movable between a rearward position and a forward position, e.g., the seat 46 may rotate between a rearward position and a forward position. The seat 46 is in the rearward position in FIGS. 1 and 2. As an example, the seat 46 may include a base 48 that attaches to the body 24 of the vehicle. The base 48 may allow the seat 46 to be movable relative to the passenger compartment, e.g., the seat 46 may rotate about the base 48. In one example, when the vehicle 10 is in the autonomous mode, the seat 46 may be in the rearward position such that the occupant of the seat 46 may face other occupants in rear seats of the vehicle. In another example, when vehicle 10 in being manually operated, the seat 46 may be in the forward position, such that the occupant may have a field of view to drive the vehicle.

The seat 46 may include a seat back 50. When the seat 46 is in the rearward position, the seat back 50 is adjacent the hinge pillar 12, as shown in FIGS. 1 and 2. Specifically, the seat back 50 and the hinge pillar 12 are on a common cross-vehicle axis when the seat 46 is in the rearward position. In addition, the sealed bladder 16, specifically the second chamber 20 of the sealed bladder 16 is on a common cross-vehicle axis with the seat back 50. Accordingly, in the event of an impact to the vehicle 10 aligned with the seat back 50, the second chamber 20 of the sealed bladder 16 detects the impact, which may be used to determine whether airbags should be deployed. When the seat 46 is in the forward position, the seat back 50 is offset from the hinge pillar 12, i.e., the seat back 50 and the hinge pillar 12 are not on a common cross-vehicle axis.

Figure 6:
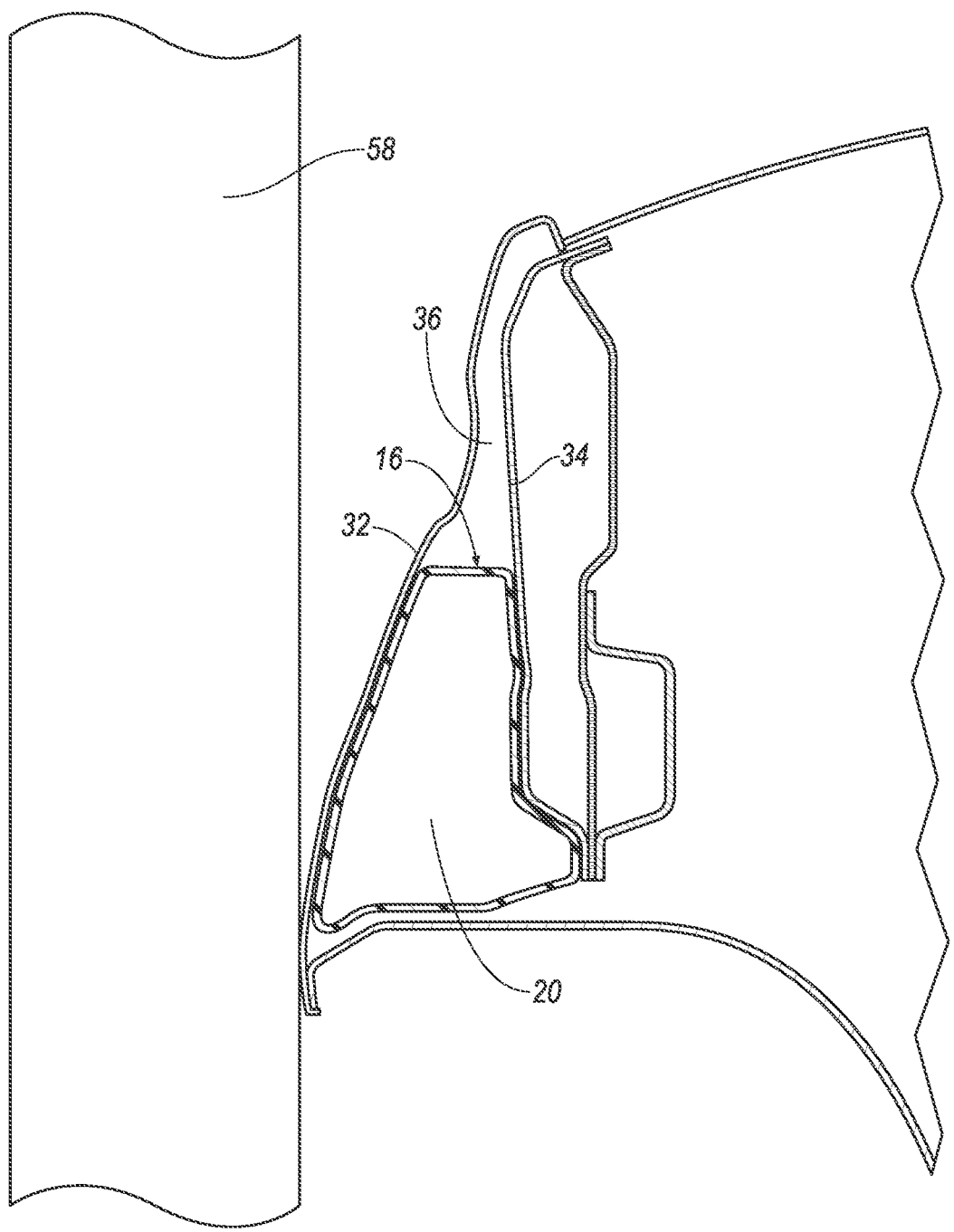
FIG. 6 is a cross-sectional view through line 5 in FIG. 1.
Figure 7:
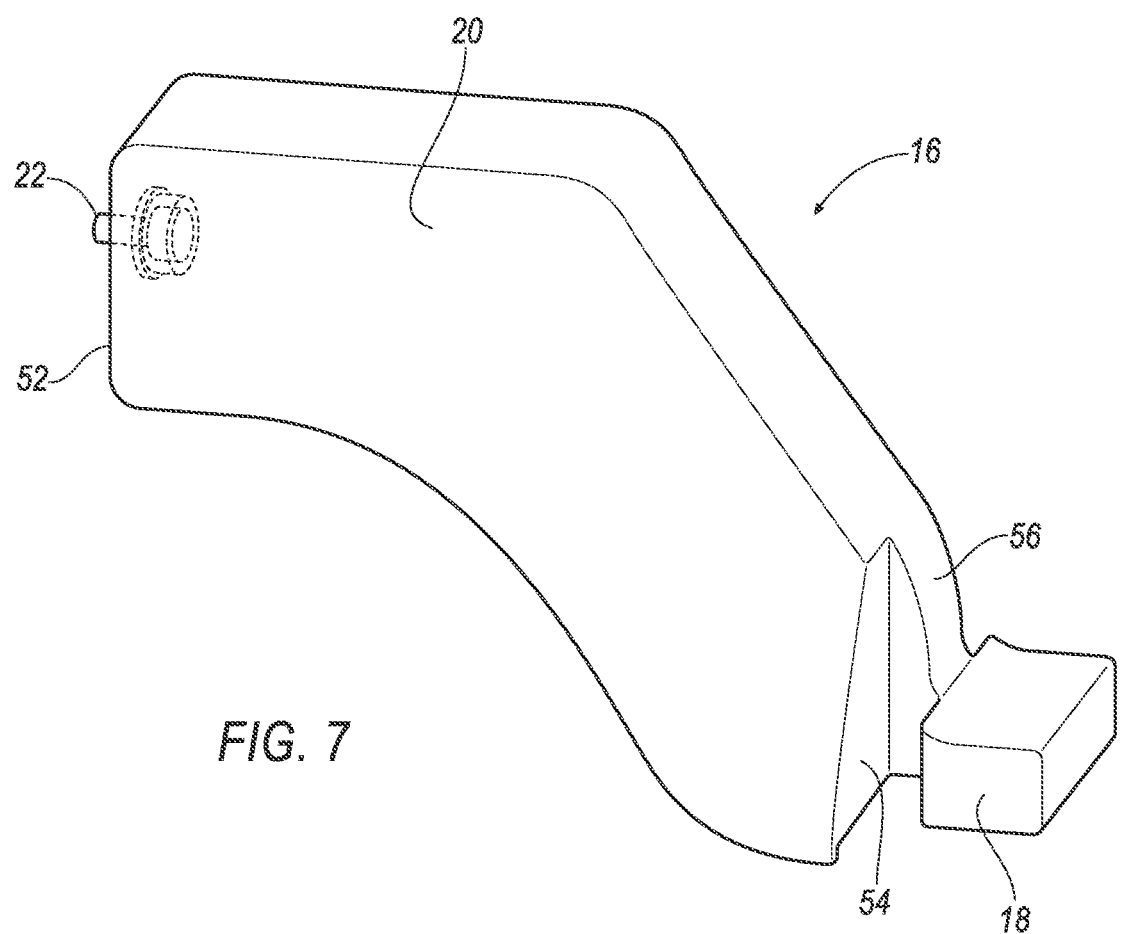
FIG. 7 is a perspective view of the sealed bladder.

The sealed bladder 16 is sealed. In other words, fluid is sealed in the sealed bladder 16 and fluid cannot enter or escape the sealed bladder 16. With reference to FIG. 6, the sealed bladder 16 includes the first chamber 18 and the second chamber 20. The first chamber 18 and the second chamber 20 are in fluid communication with each other. Because the chambers 18, 20 are in fluid communication and the sealed bladder 16 is sealed, a pressure change in either chamber 18, 20 is transmitted to the other chamber 18, 20.

As shown in FIG. 6, the pressure sensor 22 is fixed to the second chamber 20. The pressure sensor 22 is in fluid communication with the second chamber 20. The pressure sensor 22 change in pressure in sealed bladder 16. The pressure sensor 22 may transmit a signal to a vehicle computer indicating that the vehicle 10 has experienced an impact. As set forth above, this information may be used to deploy airbags in the passenger compartment.

As discussed above, the first chamber 18 is on the hinge pillar 12. Said another way, the first chamber 18 may be on the hinge pillar outer 28 of the hinge pillar 12. The first chamber 18 is attached on the hinge pillar 12 in any suitable manner, e.g., clips, welding, etc. The first chamber 18 may be aligned with the seat back 50 of the seat 46. The first chamber 18 is exposed when the door 38 is in the open position.

When the door 38 is in the closed position, the first chamber 18 is between the hinge pillar 12 and the door 38. For example, the first chamber 18 may be in the cross-vehicle gap 42 between the hinge pillar 12 and the door 38 when the door 38 is in the closed position. The first chamber 18 may not be exposed when the door 38 is in the closed position. The first chamber 18 may not be visible to the occupant when the occupant is in the passenger compartment and the door 38 is in the closed position.

The first chamber 18 may be positioned between the hinges 40 of the door 38 on the hinge pillar 12. In one example, the first chamber 18 may be positioned between the hinges 40 of the door 38 on the hinge pillar outer 28. The first chamber 18 may be at any position between the hinges 40. In one example, the first chamber 18 may be position at a position lower on the hinge pillar outer 28, i.e., the first chamber 18 is positioned closer to the lower of the pair of hinges 40.

As shown in FIGS. 1-5 and as discussed above, the second chamber 20 is positioned in the fender 14. In one example, the second chamber 20 is positioned in the cavity 36 between the fender inner 34 and the fender outer 32. The second chamber 20 may be attached in the cavity 36 in any suitable manner, e.g., clips, welding, etc. The second chamber 20 is not exposed when the door 38 is in the open position or the closed position, i.e. the second chamber 20 is not visible to an occupant inside or outside of the vehicle.

The second chamber 20 may include a vehicle-forward end 52 and a vehicle-rearward end 54. The pressure sensor 22 may be located at the vehicle-forward end 52 of the second chamber 20. The pressure sensor 22 is fixed to the second chamber 20. The pressure sensor 22 may be attached in the fender 14, i.e., the pressure sensor 22 may be attached to the fender inner 34 or the fender outer 32 inside the cavity 36 in addition to the second chamber 20 but remain in fluid communication with the second chamber 20.

The first chamber 18 may have a volume smaller than the second chamber 20, i.e., the second chamber 20 is larger than the first chamber 18. In one example, the first chamber 18 may contain less fluid than the second chamber 20.

As best shown in FIG. 6, the sealed bladder 16 may include a connector 56 that fluidly connects the first chamber 18 and the second chamber 20. Because the connector 56 fluidly connects the first chamber 18 and the second chamber 20, the connector 56 transfers pressure changes between the first chamber 18 and the second chamber 20. The connector 56 may be between the first chamber 18 and second chamber 20. The connector 56 extends from the first chamber 18 to the vehicle-rearward end 54 of the second chamber 20. The connector 56 may be in the cross-vehicle gap 42. The connector 56 extends from the cross-vehicle gap 42 into the cavity 36 of the fender 14.

The connector 56 may be exposed when the door 38 is in the open position, i.e., the connector 56 may be visible to the occupant. The connector 56 of the sealed bladder 16 may be aligned with the vehicle-forward gap 44 in the cross-vehicle direction Cv.

With continued reference to FIG. 6, the first chamber 18 and the second chamber 20 may each reduce in volume to the connector 56. Specifically, the connector 56 may be thinner than the first chamber 18 and the second chamber 20 in the cross-vehicle direction Cv. In one example, the first chamber 18 and the second chamber 20 may have a necking portion where the volume of chambers 18, 20 reduces to the connector 56 and the width of the connector 56 is thinner than the width of the chambers 18, 20.

The connector 56 at the first chamber 18 may have the same height as the first chamber 18 in a vertical direction. The connector 56 at the second chamber 20 may have the same height as the second chamber 20 in a vertical direction. In one example, where the height of the first chamber 18 is smaller than the height of the second chamber 20, the height of the connector 56 at the first chamber 18 will be smaller than the height at the second chamber 20.

Figure 5:
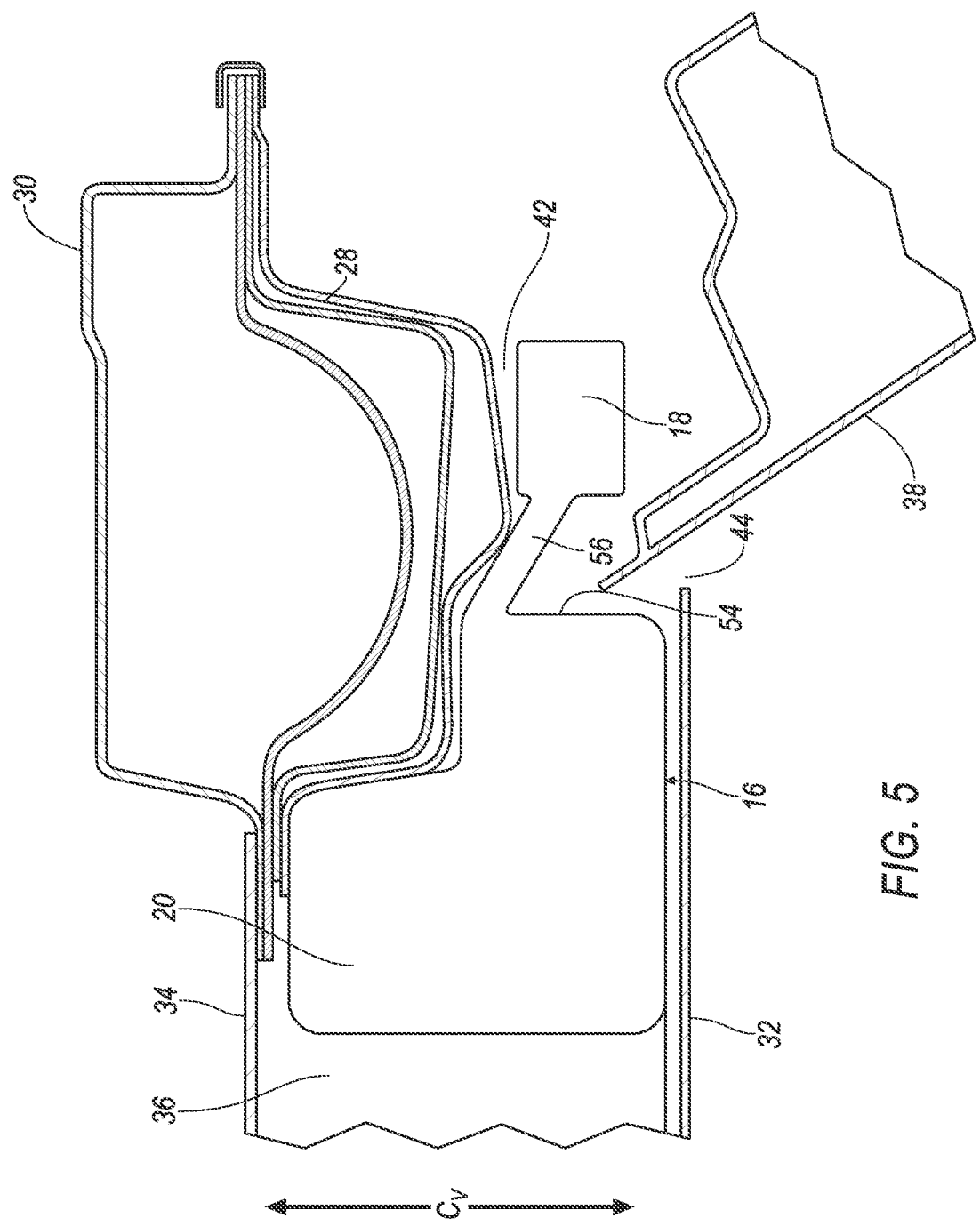
FIG. 5 is a cross-sectional view through line 4 in FIG. 1 with the door in an open position.

Because the connector 56 is thinner than the chambers 18, 20 in the cross-vehicle direction Cv, the connector 56, first chamber 18 and second chamber 20 define a cutout. The cutout may be in the cross-vehicle gap 42 between the door 38 and the hinge pillar 12 when the door 38 is in the closed position. The door 38 extends into the cutout when the door 38 is in an open position, as shown in FIG. 5. In one example, when the door 38 is in the open position, the door 38 may rotate into the cutout.

The first chamber 18 is positioned to be compressed by a pole of a 15° oblique pole crash test. The pole 58 of the 15° oblique pole crash test is shown in FIG. 6. During a 15° oblique pole crash test, the pole 58 impacts the fender 14. Deformation of the fender 14 compresses the first chamber 18. As stated above, the compression of the first chamber 18 causes a pressure change which transfers through the connector 56 to the second chamber 20. The pressure sensor 22 measures the pressure change and may transmit a signal to the vehicle computer indicating that the vehicle 10 has experienced an impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a hinge pillar;
a fender adjacent the hinge pillar;
a sealed bladder including a first chamber and a second chamber in fluid communication with the first chamber, the first chamber being on the hinge pillar and the second chamber being in the fender; and
a pressure sensor fixed to the second chamber and in fluid communication with the second chamber.

2. The vehicle of claim 1, wherein the sealed bladder includes a connector fluidly connecting the first chamber and the second chamber.

3. The vehicle of claim 2, wherein the first chamber and the second chamber each reduce in volume to the connector.

4. The vehicle of claim 2, wherein the connector is thinner than the first chamber and the second chamber in a cross-vehicle direction.

5. The vehicle of claim 4, wherein the connector at the first chamber has the same height as the first chamber in a vertical direction, and wherein the connector at the second chamber has the same height as the second chamber in a vertical direction.

6. The vehicle of claim 1, wherein the first chamber has a volume smaller than the second chamber.

7. The vehicle of claim 1, further comprising a door having a pair of hinges attached to the hinge pillar, the door being rotatable about the hinges.

8. The vehicle of claim 7, further comprising a seat movable to a rearward position and including a seat back, the seat back being adjacent the hinge pillar and the door in the rearward position.

9. The vehicle of claim 7, wherein the first chamber is positioned between the hinges.

10. The vehicle of claim 7, wherein the door overlaps the hinge pillar in a cross-vehicle direction and defines a cross-vehicle gap between the door and the hinge pillar, and wherein the door is adjacent the fender defining a vehicle-forward gap between the door and the fender.

11. The vehicle of claim 10, wherein the sealed bladder includes a connector fluidly connecting the first chamber and the second chamber, the vehicle-forward gap being aligned with the connector in a cross-vehicle direction.

12. The vehicle of claim 11, wherein the connector is in the cross-vehicle gap.

13. The vehicle of claim 11, wherein the connector, first chamber and second chamber define a cutout in the cross-vehicle gap and the door extends into the cutout when the door is in an open position.

14. The vehicle of claim 13, wherein the first chamber is exposed when the door is in the open position.

15. The vehicle of claim 7, wherein the first chamber is between the hinge pillar and the door.

16. The vehicle of claim 15, wherein the first chamber is exposed when the door is in the open position.

17. The vehicle of claim 1, wherein the second chamber has a vehicle-forward end and the pressure sensor is located on the vehicle-forward end.

18. The vehicle of claim 1, further comprising a seat movable to a rearward position and including a seat back, the seat back being adjacent the hinge pillar.

19. The vehicle of claim 1, wherein the first chamber is positioned to be compressed by a pole of a 15° oblique pole crash test.

\* \* \* \* \*